No. 841,802. PATENTED JAN. 22, 1907.
T. MIDGLEY.
WHEEL RIM.
APPLICATION FILED JULY 1, 1905.

Witnesses
Thomas Midgley, Inventor
By his Attorney

UNITED STATES PATENT OFFICE.

THOMAS MIDGLEY, OF HARTFORD, CONNECTICUT, ASSIGNOR TO THE HARTFORD RUBBER WORKS COMPANY, A CORPORATION OF CONNECTICUT.

WHEEL-RIM.

No. 841,802.   Specification of Letters Patent.   Patented Jan. 22, 1907.

Application filed July 1, 1905. Serial No. 267,998.

*To all whom it may concern:*

Be it known that I, THOMAS MIDGLEY, a citizen of the United States, residing in the city of Hartford, county of Hartford, and State of Connecticut, have invented new and useful Improvements in Wheel-Rims, of which the following is a specification.

This invention relates to wheel-rims, and more particularly to a clip or cover for the joint in a contractible and expansible side flange for such rims.

The object of the invention is to provide a clip or cover for the joint in a contractible and expansible side flange which is securely fastened to the side flange in such a way that it cannot become detached therefrom, but can be swung out of the way to permit access to the joint and can be conveniently fastened in position to cover the joint completely and protect a resilient wheel-tire from injury through contact with the edges presented by the ends of the side flange at the joint.

A further object of the invention is to provide a contractible and expansible side flange with a clip or cover for the joint therein which serves not only to protect a resilient tire from injury through contact with the ends of the side flange, but also assists in securing the side flange upon the seat provided therefor upon the wheel-rim.

With the objects above stated in view, as well as others, which will hereinafter appear, the invention consists in certain features of construction, arrangement, and combination of parts hereinafter described, illustrated in the accompanying drawings, and particularly pointed out in the appended claims.

Figure 1:
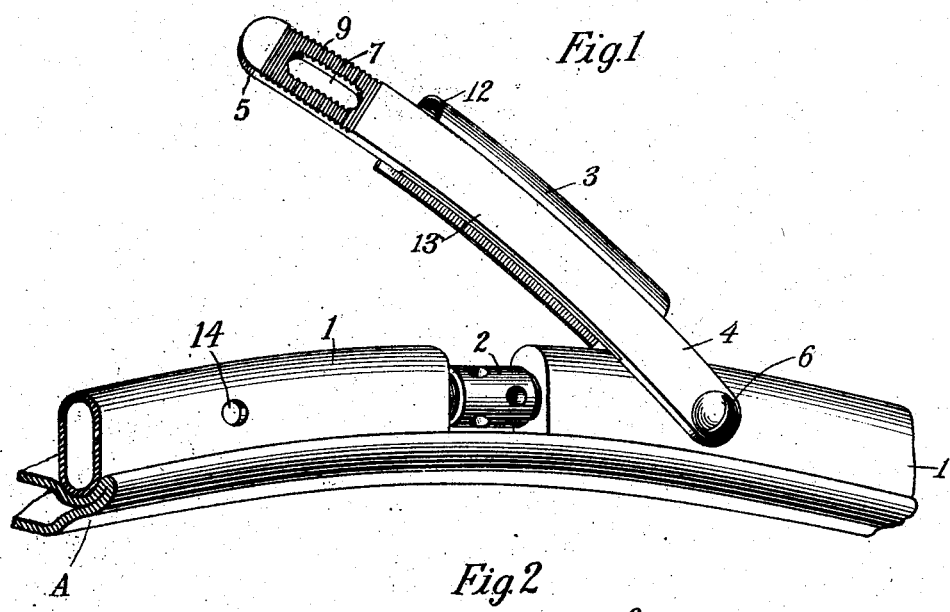
Figure 2:
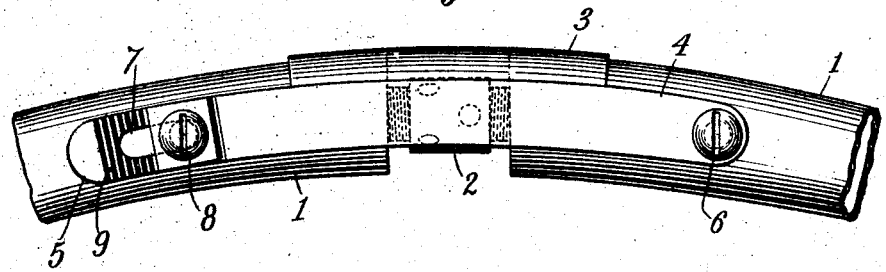
Figure 3:
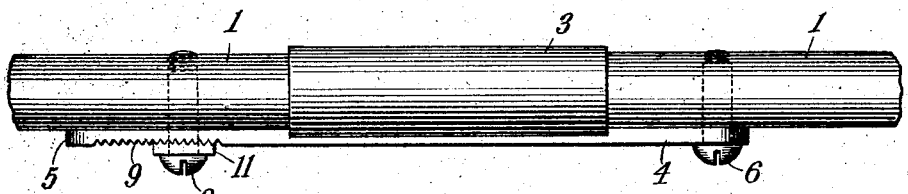
Figure 4:
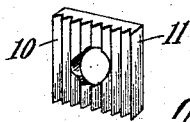

In the drawings, Figure 1 is a perspective view of the joint in a contractible and expansible side flange, together with the adjacent portions of the side flange and a clip constructed in accord with the present invention, the clip being raised to permit access to the joint. Fig. 2 is an elevational view of the joint in the side flange, the adjacent portions of the side flange, and the clip, the clip being secured in position over the joint. Fig. 3 is a top view of the structure shown in Fig. 2. Fig. 4 is a perspective view of the lock-plate employed in connection with the clip to serve as a flange-securing device.

As is well known, many wheel-rims characterized by removable side flanges have been devised for the reception of elastic tires, the side flanges being made removable to facilitate the application of the tires to the rims and the removal of the tires therefrom. Many of the removable side flanges devised are provided with means for expanding and contracting them, and in such side flanges a turnbuckle or equivalent device is ordinarily employed, the turnbuckle being placed between the ends of the side flange in substantially the manner indicated in Fig. 1. In side flanges of this type the edges or shoulders presented by the ends of the side flange will soon injure a pneumatic tire to considerable extent if no protecting clip or cover is provided to prevent contact of the tire with these edges or shoulders. Protecting clips or covers for these side flanges may be made entirely separate from the side flanges and be held in position by the resilience of the clips or covers and the pressure of the tire against them. Such clips or covers for the joints in removable side flanges protect the tire from injury as long as they remain in position, and there is but little danger of such clips or covers becoming detached as long as the tire remains inflated. When, however, the tire becomes deflated, the clip is apt to become detached from the side flange, and so make injury to the tire inevitable. The clip which forms the present invention is so constructed that its accidental removal is impossible, and it also supplements the action of the turnbuckle in securing the side flange upon its seat, thus relieving the turnbuckle of a portion of the strain to which it is subjected.

Referring to the drawings, in which corresponding parts are designated by similar characters of reference in the several views, 1 designates the side flange proper, which engages a seat on the wheel-rim A. The turnbuckle 2, which connects the ends of the side flange, may be of any ordinary or preferred type, but is preferably partially inclosed by the ends of the side flange. The clip 3 fits closely over the side flange and is provided with arms 4 and 5, extending therefrom at the ends, and is secured to the side flange adjacent to the joint by means of a screw 6, which extends through a suitable opening in the arm 4 and serves as a pivot about which the entire clip turns. The arm 5 is longitudinally slotted at 7 for the reception of a securing-screw 8, and the outer surface of the rim 5, adjacent to the slot 7, is transversely serrated, as shown at 9. These serrations are provided to coöperate with the serrated face 10 of a locking-plate 11, which is secured in engagement with the serrations 9 by means of the fastening-screw.

In the construction of the clip as above described a single piece of metal may be employed, if desired; but the clip is preferably constructed of a piece of thin metal forming the clip proper or cover 12 and a bar 13, to which the clip is securely fastened in any suitable manner. This construction is preferred, because the arms 4 and 5 should be of greater thickness and strength than is required for the portion of the clip which serves as a cover or shield for the joint in the side flange.

The use of the clip above described will be understood from the description and the accompanying drawings. When the clip is raised, as shown in Fig. 1, free access to the turnbuckle 2 is permitted, so that the side flange may be expanded or contracted at will. After the side flange has been secured in position upon the seat provided for it on the wheel-rim the clip is depressed into the position shown in Fig. 2, and the fastening-screw 8, with the locking-plate 11 mounted thereon, is introduced into the threaded hole 14, provided for it in the side flange. When the screw 8 is tightened, the locking-plate 11 will be brought into positive engagement with the serrations provided on the arm 5 of the clip, and the bar 13 will then form a supplemental securing device to assist the turnbuckle in withstanding the strain imposed upon the side flange when the tire is inflated. As long as the screw 8 is in position the arched cover 12 will be kept in position over the turnbuckle and the adjacent ends of the side flange, and any injury to the tire from contact with the ends of the side flange or turnbuckle will be impossible. To permit access to the turnbuckle for removing the side flange, the screw 8 and the locking-plate 11 are removed, and the clip may then be raised into position shown in Fig. 1, thus exposing the turnbuckle so that it may be readily operated.

Having thus described my invention, what I claim as new, and desire to secure by Letters Patent, is—

1. In a wheel-rim, a removable side flange having a joint therein and a clip or cover for said joint secured to said side flange and provided with means for fastening it in position.

2. In a wheel-rim, a removable side flange having a joint, and a clip or cover for said joint pivotally mounted on the side flange.

3. In a wheel-rim, a removable side flange having a joint therein, and a clip or cover for said joint pivoted at one end upon the side flange and provided at the other end with means for positively fastening the clip in position.

4. In a wheel-rim, the combination with a side flange having a joint therein, of a clip or cover for the joint comprising an arched portion extending over the joint and oppositely-extending arms having openings for the reception of fastening devices.

5. In a wheel-rim, the combination with a side flange having a joint therein, of contracting and expanding means disposed in said joint, and a clip or cover for said joint, said clip or cover being provided with means for positively securing it in position.

6. In a wheel-rim, a side flange transversely divided at one point, and a pivoted clip or cover positively attached to said side flange adjacent to one end and provided at the other end with means for fastening it to the other end of the side flange.

7. In a wheel-rim, a side flange having a joint therein, a clip or cover for said joint having a portion of its outer surface serrated, a locking-plate having a serrated face for engagement with the serrated portion of the surface of the clip or cover, and means for forcing the locking-plate into engagement with the clip or cover.

8. In a wheel-rim, a side flange having a joint therein, a clip or cover pivoted at one end to said side flange adjacent to the joint and having at the other end a longitudinal slotted arm, said arm being serrated on its outer surface, a locking-plate having a serrated face adapted to coöperate with the serrations on said arm, and a screw extending through said locking-plate and through the slot in said arm.

In testimony whereof I affix my signature in presence of two witnesses.

THOMAS MIDGLEY.

Witnesses:
J. BOSSEN,
D. W. PENNEY.